United States Patent
Saalfeld et al.

(10) Patent No.: US 11,089,114 B1
(45) Date of Patent: Aug. 10, 2021

(54) MESSAGE FREQUENCY MODIFICATION FOR CONNECTION MAINTENANCE

(71) Applicant: Amazon Technologies, Inc., Seattle, WA (US)

(72) Inventors: Christoph Saalfeld, Seattle, WA (US); David Craig Yanacek, Seattle, WA (US); Alexandra Elizabeth Baoboe Lee, Seattle, WA (US); Tristam Kyle MacDonald, Seattle, WA (US); Dinkar Pataballa, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 169 days.

(21) Appl. No.: 15/720,931

(22) Filed: Sep. 29, 2017

(51) Int. Cl.
*H04L 29/08* (2006.01)
*H04L 12/26* (2006.01)

(52) U.S. Cl.
CPC ............ *H04L 67/145* (2013.01); *H04L 43/10* (2013.01); *H04L 67/12* (2013.01)

(58) Field of Classification Search
CPC ........ H04L 67/145; H04L 43/10; H04L 67/12
See application file for complete search history.

(56) References Cited

U.S. PATENT DOCUMENTS

| | | | | |
|---|---|---|---|---|
| 2012/0008536 | A1* | 1/2012 | Tervahauta | H04W 24/08 370/311 |
| 2013/0007484 | A1* | 1/2013 | Gobriel | G06F 1/3209 713/320 |
| 2014/0066063 | A1* | 3/2014 | Park | H04W 4/12 455/435.1 |
| 2014/0226562 | A1* | 8/2014 | Shah | H04W 68/00 370/328 |
| 2015/0215307 | A1* | 7/2015 | Herzog | H04L 63/102 726/9 |
| 2015/0282177 | A1* | 10/2015 | Dong | H04L 43/0811 370/329 |
| 2017/0105243 | A1* | 4/2017 | Howry | H04W 68/00 |
| 2018/0352586 | A1* | 12/2018 | Pollack | H04W 76/25 |

* cited by examiner

*Primary Examiner* — Shirley X Zhang
(74) *Attorney, Agent, or Firm* — Davis Wright Tremaine LLP

(57) ABSTRACT

A technology is described for modifying a message frequency of a device. In one example, a network connection is identified between a device and a service provider environment. A message frequency is set for which to send reachability messages between the device and the service provider environment to maintain the network connection. The reachability messages may be sent between the device and the service provider environment at the message frequency. After testing whether the networking connection is maintained at the message frequency, the message frequency may be modified to a modified message frequency.

20 Claims, 9 Drawing Sheets

MESSAGE FREQUENCY MODIFICATION FOR CONNECTION MAINTENANCE

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems, and farming equipment may now rely upon electronic sensors and control systems.

Advancements in communication technologies have allowed for even relatively simple electronic devices to communicate with other devices and computing systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of the building's heating, cooling, and ventilation systems. Even home appliances and light switches offer the possibility of being configured with communication capabilities for the purpose of transmitting status and receiving external control communications. Such devices may obtain benefits from frequent networking communication with centralized computing services or other monitoring systems.

DETAILED DESCRIPTION

Figure 1A:
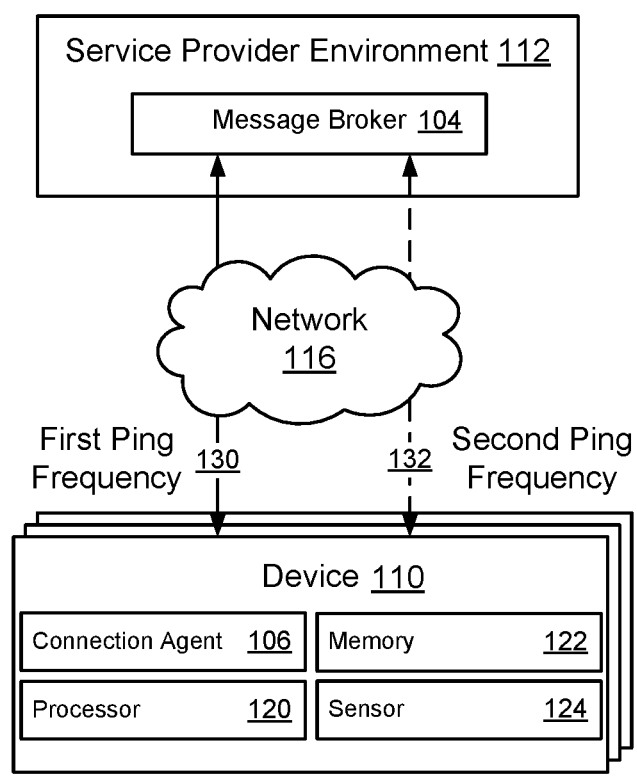
FIG. 1A is a block diagram illustrating a system for modifying a ping frequency of a device in communication with a service provider environment in accordance with an example of the present technology.

A technology is described for modifying a message frequency of a device connected via a network to a service provider environment in order to maintain a connection of the device to the service provider environment. For example, the device may be connected to a service provider environment over the internet. A device may be one of many devices that create a large network of addressable devices. This "network" is commonly referred to as the Internet of Things (IoT). An IoT device may be connected electronically to a service provider environment that is separate or remote from a physical computing device. The technology for modifying a message frequency of a device for sending reachability messages to the service provider environment may include establishing a network connection between the device and a service provider environment. The network connection may be a secure connection, such as a TCP/IP (Transmission Control Protocol/Internet Protocol) connection using TLS (Transport Layer Security), for example.

A message frequency may be set to send reachability messages from the device to the service provider environment to maintain the network connection. For example, the reachability messages may be ping messages, data messages, or other types of messages. The reachability messages may be sent from the device to the service provider environment at the message frequency. The reachability messages may confirm to a server in the service provider environment that the device is reachable and may serve to maintain the network connection between the device and the service provider environment. In addition, the reachability messages may also be used to maintain the connection information that is stored in routers, load balancers, gateways, switches, bridges, firewalls, proxy servers, and other networking devices along the networking route that use NAT (Network Address Translation), TCP/IP connection proxying, or similar connection translation or proxying. After testing whether the networking connection is maintained at the message frequency, the message frequency may be modified to a modified message frequency. Modification of the message frequency may enhance the message frequency, such as by decreasing the message frequency, to reduce bandwidth, improve processor usage, and/or improve power usage while ensuring stability of the network connection.

In a more specific example of the present technology, a method is provided for modifying a ping frequency of a device. The method may include identifying a network connection between the device and a message broker in a service provider environment via a networking device. In one example, the device may be an IoT device on a local network and the networking device may be a router by which devices on the local network communicate with the internet. The device may establish or request a network connection with the message broker. The method may include setting the ping frequency at which to send ping messages from the device to the message broker to maintain the network connection between the networking device and the message broker. The ping messages may be sent from the device to the message broker via the networking device at the ping frequency. The method may further include testing whether the network connection is maintained at the ping frequency and modifying the ping frequency to a modified ping frequency when the network connection is not maintained. The method may also include modifying the ping frequency when the network connection is maintained. For example, the ping frequency may be increased to send ping messages at shorter intervals when the network connection is not maintained and/or the ping frequency may be decreased to send ping messages at longer intervals when the network connection is maintained. After modifying the ping frequency, the method may include a subsequent testing step to test whether the network connection is maintained at the modified ping frequency. The process may be repeated as desired to enhance the ping frequency.

In another example, a method may include establishing a network connection between a device and a message broker in a service provider environment. In this example, a ping frequency is received at the device from the message broker. In other words, the message broker may send an instruction to the device to send ping messages from the device to the message broker at a specified ping frequency in order to maintain the network connection. In other examples, the device may select the ping frequency to use. The method may include sending the ping messages from the device to the message broker at the ping frequency and testing whether the network connection is maintained at the ping frequency. The method may further include modifying the ping frequency to a modified ping frequency by decreasing the ping frequency when the network connection is maintained at the ping frequency and/or increasing the ping frequency when the network connection is not maintained at the ping frequency. A test or determination may be made as to whether the network connection is maintained at the modified ping frequency. The modification of the frequency may be made by receiving a subsequent instruction from the message broker. Alternatively, the device may determine the modification of the ping frequency.

Reachability of a device to determine a status of the device or to send instructions to the device may improve usability of the device. For example, being able to determine from a mobile phone whether an alarm system is set to 'on' and being able to turn the system 'on' or 'off' may be useful in enhancing security. However, some devices have limited network bandwidth availability (or can have increased costs with increased bandwidth usage), or have a limited power supply, such as a rechargeable battery. Sending and receiving messages to and from the device consumes bandwidth and utilizes the processor, which increases the power usage and decreases available battery life. If reachability messages are sent too infrequently, a connection to a message broker may be lost and status of the device may become unknown. The connection may be lost because networking devices such as: routers, load balancers, gateways, switches, bridges, firewalls, NAT (Network Address Translation) servers, proxy servers, and other networking devices along the networking route that use NAT, TCP/IP connection proxying, or similar connection translation or proxying, may drop the connection information when the networking devices determine that a connection is inactive because no traffic is flowing during a defined time period. Further, instructions sent to the device may be undeliverable. However, if reachability messages are sent too frequently, the reachability messages may unnecessarily use network bandwidth, processing availability, battery charge, etc. The present technology may improve the frequency of reachability messages by reducing bandwidth, improving processor usage, and/or improving power usage while ensuring stability of the network connection, and in turn ensuring the usability of the device.

FIG. 1A is a block diagram illustrating a high level example of a system and method for managing device 110 reachability using a message transmission frequency to a service provider environment 112. For simplicity in this and other examples, the reachability messages may be referred to as ping messages, which are considered one of multiple types of reachability messages. A ping message may include one or more echo requests. Reachability messages may include ping messages, data messages, or any other type of message which may serve to maintain a connection between endpoints of a secured connection by virtue of being sent. A connection agent 106 on the device 110 may initiate a network connection to the service provider environment 112 over a network 116, such as the internet, a wide area network (WAN) or another network. More particularly, the connection agent 106 may establish a connection between the device 110 and a message broker 104 in the service provider environment 112. The message broker 104 may be one or more servers (e.g., a physical server or a virtual server (also referred to herein as a 'computing instance' or 'virtual machine')), or may be a service executed on one or more servers in the service provider environment 112. While this example is described in the context of establishing a network connection from the device 110 to the message broker 104, in some examples the connection may be established or requested by the message broker 104 or by an intermediary networking device, for example. When the connection or connection request does not originate from the device 110, the device 110 may run a server to accept connections on an identified networking port. Either the device 110 or the message broker 104 (or a networking device) may identify the presence of a connection and may send reachability messages.

The message broker 104 may be a publish/subscribe broker service that enables the sending and receiving of messages to and from the service provider environment 112. When communicating with the service provider environment 112, the device 110 may send a message addressed to a topic, such as Sensor/temp/room1, for example. The message broker 104, in turn, may send the message to other devices that have registered to receive messages for that topic. Sending the message may be referred to as publishing and registering to receive messages for a topic filter may be referred to as subscribing. The message broker 104 may maintain a list of device sessions and subscriptions for each session. When a message is published on a topic, the message broker 104 may check for sessions with subscriptions that map to the topic. The broker 104 may then forward the publish message to subscribed sessions that have a currently connected device (e.g., device 110).

The system may include a plurality of the devices 110 in communication with the service provider environment 112 via one or more networks 116. Non-limiting examples of the devices 110 may include network addressable: global positioning devices, temperature sensors, water sensors, light switches, light bulbs, power outlets, watches, media players, voice command devices, video cameras, security systems, door locks, smoke alarms, thermostats, weather sensors, vehicles, industrial manufacturing equipment, handheld devices, as well as any other device configured to communicate over the network 116.

Figure 4:
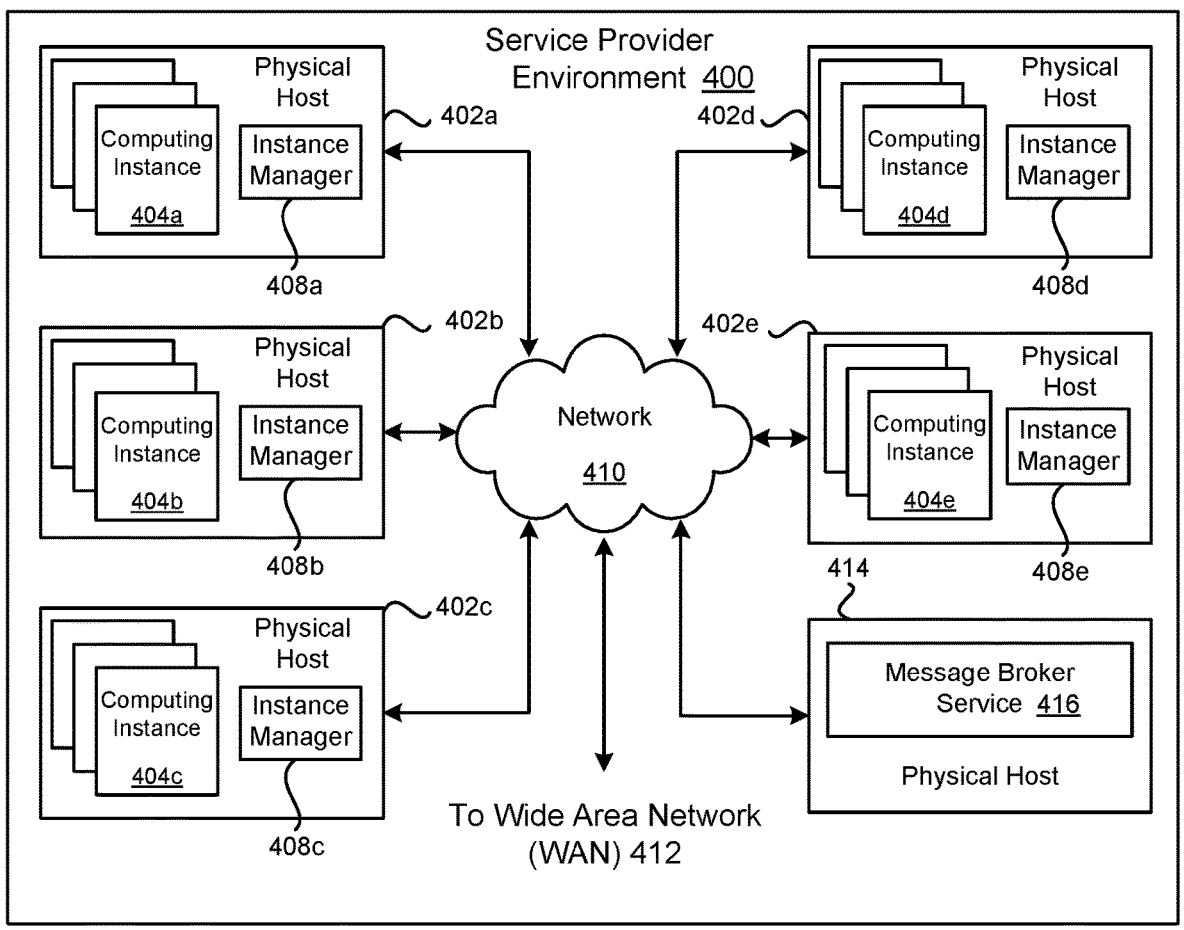
FIG. 4 is a block diagram that illustrates a service provider environment that includes a message broker service in accordance with an example of the present technology.

The service provider environment 112 may include servers for executing computing instances (e.g., virtual machines) as described in relation to FIG. 4. The computing instances may host various services available to the devices 110. The system may enable one-to-one and one-to-many communications using the message broker 104. A one-to-many communication pattern may allow a device 110 to broadcast data to multiple subscribers for a given topic. For example, a system component may publish a message to a named logical channel (e.g., topic) and the message may be distributed to subscribed system components. System components may include, but are not limited to, the devices 110, clients, applications and services, etc.

When the device 110 has established a network connection to the message broker 104 in the service provider environment 112, sending a reachability message, such as a ping message, to the message broker 104 from the device 110 may enable the maintenance of an established connection (i.e., sending the message may keep the connection open). The ping message may serve multiple purposes. For example, sending the ping message informs the message broker 104 that the device 110 is still connected. Also, sending data through an open TCP/IP connection ensures that every TCP/IP proxy or Network Address Translation (NAT) device that is in the network communication path between the connected device and the message broker renews a TTL (time to live timeout) for the established connection and thereby ensures that the logical 'pipe,' or connection, remains open. This can be useful since modern publish and subscribe APIs (Application Programming Interfaces) used by a service provider environment 112 assume that a back-end service (e.g., message broker 104) can, at any given moment, send a message to the connected device 110 without the device 110 having to request data (e.g., through polling).

A ping is a networking function that may be used to test the reachability of a host on an Internet Protocol (IP) network. Ping may measure the round-trip time for messages sent from the originating host to a destination computer that are echoed back to the source. For example, a ping message may be transferred through a TLS connection and validates that the connection is still alive and that data can be received by the client from the message broker. Sending ping messages through the TLS connection also ensures that the message broker can identify that it is the same device that is still connected since the TLS connection is authenticated and encrypted. This also ensures that authenticated devices can keep a connection open and consume resources of the message broker, for which the authenticated device, or the operator or owner thereof, may be assessed a fee. Network connections, once established, generally are not maintained indefinitely. Rather, the server, such as the message broker, may maintain the active open connection to the device as long as the server can reasonably ascertain that the device is still present and operational. The ping messages sent by the device to the server may thus serve a purpose of informing the server that the device is still present so that the connection is maintained. The actual ping of the ping message may have limited data or computing value, so long as the first ping message and a subsequent ping message are sent from the device and received by the server within a ping frequency that is short enough that the connection is maintained.

Figure 1B:
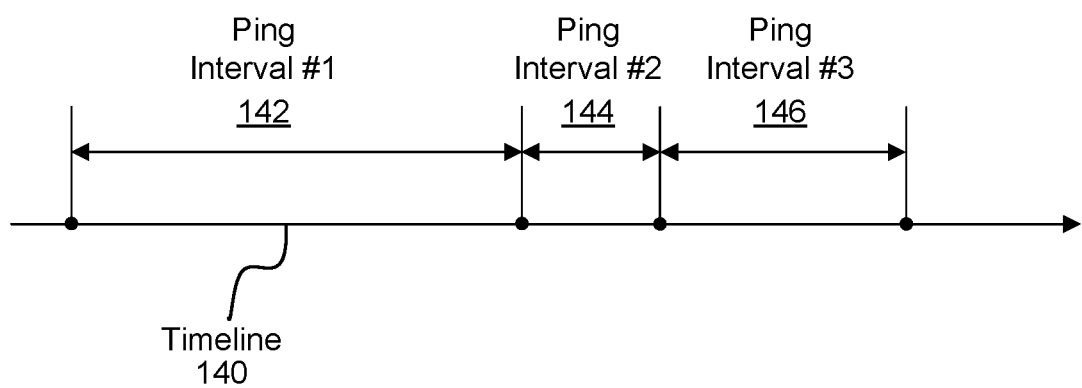
FIG. 1B is a timeline illustration of modifying a ping interval in accordance with an example of the present technology.

The present technology may automatically determine an enhanced ping interval or ping frequency. For example, the device 110 may select an initial, relatively large value X for the ping interval and then repeatedly decrease the ping interval by a defined amount Y. In other words, the device 110 may select a relatively small value for the ping frequency and then repeatedly increase the ping frequency by a defined amount. Alternatively, the device 110 may select an initial, relatively small value X for the ping interval and then repeatedly increase the ping interval by a defined amount Y. In other words, the device 110 may select a relatively large value for the ping frequency and then repeatedly decrease the ping frequency by a defined amount. When the ping interval or ping frequency is modified, the degree of modification may be defined by an absolute value (e.g., a set number value) or fractional value (e.g. a percentage) of a current ping interval or frequency. The value (e.g., change value of the degree of modification or rate of change of the degree of modification) may remain constant between modifications or may be variable between modifications. For example, if a maximum ping interval is selected at 20 seconds and a connection is not maintained, the ping interval may be repeatedly decreased by one second intervals to test connectivity at shorter intervals. In this example, a one second decrease from 20 seconds represents a 5% decrease in interval length. Rather than using a constant one second interval decrease, the decrease may be a constant 5% decrease. Thus, from a 20 second interval the decrease would be one second, while from a 19 second interval the decrease would be 0.95 seconds. In another example, the degree of modification may become successively smaller without using a constant percentage (e.g., non-linearly). For example, if connectivity is not maintained at a 20 second interval, the interval may be reduced by five seconds. If connectivity is not maintained at 15 seconds, the interval may be reduced three seconds, etc. If connectivity is maintained at 15 seconds, the interval may be increased by one or two seconds, etc. In yet another example, the degree of modification may be larger until connectivity is maintained and then the modification may be reduced. For example, if connectivity is not maintained at a 20 second interval, the interval may be reduced by five seconds. If connectivity is not maintained at 15 seconds, the interval may again be reduced by five seconds. If connectivity is maintained at 10 seconds, the interval may be increased by two seconds, and so forth for fine tuning to discover a usable interval in between the unusable 15 second interval and the usable 10 second interval. In accordance with this example, FIG. 1B illustrates a timeline 140 with a modification of a ping interval 142 by first decreasing the ping interval to ping interval 144 and then increasing the ping interval to ping interval 146 to discover a usable ping interval.

In some examples, the ping interval or ping frequency may be modified by a random factor. The modification may be performed any number of times. The degree of modification each time may vary randomly, linearly, non-randomly, non-linearly, exponentially, etc. Where multiple devices maintain a connection with the message broker, each device may modify the ping frequency differently or at different rates so that the devices do not follow a single modification pattern or process and cause congestion. The modifications to the ping frequency may be made with a bias toward obtaining a stable connection more so than identifying an optimal ping frequency. In one example, when a connection is not maintained, the ping frequency may be doubled or otherwise significantly increased in order to quickly obtain and maintain a network connection. Further modifications of the ping frequency may be smaller to avoid losing the network connection.

With continued reference to FIG. 1A, the ping interval or ping frequency may be modified when the device 110 attempts to ping the message broker 104 and discovers that the connection was already closed. To improve resiliency, the device 110 may wait to decrease the interval until after multiple ping attempts (e.g., a predetermined number of attempts) where the connection is discovered to be closed. The device 110 may continue to decrease a ping interval until the ping interval reaches an interval that succeeds in maintaining the connection.

The ping interval or ping frequency may be modified when the device 110 attempts to ping the message broker 104 and discovers that the connection was maintained. In such an example, the ping interval may be overly short. Lengthening the ping interval may be beneficial in terms of reducing network usage, reducing processor usage, increasing battery life, or the like. The device 110 may continue to increase a ping interval until the ping interval reaches an interval that does not succeed in maintaining the connection and may then revert to a previous shorter interval (i.e., higher ping frequency) which does succeed in maintaining the connection.

FIG. 1A illustrates a first ping frequency 130. The first ping frequency 130 may represent a current ping frequency and/or a modification of the current ping frequency. In one example, the current and modified ping frequencies represented by the first ping frequency 130 may be separated in time. In other words, the current ping frequency may be used until the current ping frequency is modified to create the modified ping frequency, after which the sole ping frequency in use is the modified ping frequency. The modified ping frequency may thus become the current ping frequency, which may differ from the pre-modified current ping frequency.

In another example, the device 110 may simultaneously maintain multiple ping frequencies. In this example, the first ping frequency 130 may be a sufficiently high frequency to maintain the connection to the message broker 104. The second ping frequency 132 may be different from the first ping frequency 130, and the difference may optionally be based on the first ping frequency 130, such as being a predetermined percentage or other value decrease of the first ping frequency 130. The second ping frequency 132 may be on a separate connection with the message broker 104 to ensure a constant connection on the first ping frequency 130 for transmission of status updates, receipt of instruction messages, and so forth. Meanwhile, the second ping frequency 132 may be used for testing and a discovering an enhanced ping frequency. When the second ping frequency 132 reaches a frequency which is decreased from the first ping frequency 130 and consistently maintains the second connection over a predetermined number of ping attempts or period of time, the first ping frequency 130 may be modified to match the second ping frequency. The second ping frequency 132 may be modified again to differ from the first ping frequency 130 in attempts to further enhance the ping frequency.

Use of multiple connections and ping frequencies may be detrimental to battery life, processor availability, etc., and thus may be limited during a given time period, such as a limit may be set for the device to make one attempt at improvement per hour, per day, per week, etc., where one attempt may include multiple modifications of the second ping frequency 132 and one modification of the first ping frequency 130. As another example, multiple connections and ping frequencies may be used when no modification of the first ping frequency 130 has been made within a predetermined period of time, such as one day, one week, etc. As another example, the multiple connections and ping frequencies may be used when the first ping frequency 130 is no longer able to consistently maintain the connection. The first ping frequency 130 may be increased enough to ensure the connection is maintained while the second ping frequency 132 may be varied to determine a new ping frequency to use for the first ping frequency 130.

The device 110 may include a processor 120 and memory 122 to process and store data to be transmitted over the network 116 or which is received over the network 116. The processor 120 and memory 122 may also process and store data which is detected by the device, such as using sensor 124. The sensor 124 may be any of a variety of sensors useful in various IoT type devices, such as a thermometer, accelerometer, camera, motion sensor, moisture sensor, etc. which may be at least a partial basis for at least some data messages, such as status updates, or the like from the device 110 to the message broker 104.

FIG. 1A illustrates example implementations of the present technology for improving data usage (e.g., where every ping counts toward a data limit on a mobile data contract), improving battery consumption (e.g., encrypting and transmitting data increases processor usage and battery consumption), and cost (e.g., various mobile or IoT connectivity providers may charge for messages such as ping and other messages) while still maintaining the device connectivity. Additionally, when a number of connected devices is large, such as numbering in the tens of billions, improving the ping frequency of these devices may cumulatively have a significant environmental impact.

The various processes and/or other functionality contained on the system components included in the system may be executed on one or more processors that are in communication with one or more memory modules. The system may include a number of computing devices that are arranged, for example, in one or more server banks or computer banks or other arrangements. The computing devices may support the service provider environment 112 using hypervisors, virtual machine monitors (VMMs) and other virtualization software.

API calls, procedure calls or other network commands that may be made in relation to the modules and services included in the service provider environment 112 and may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 116 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 1A illustrates certain processing modules in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 1A illustrates an example of a system that may implement the techniques above, many other similar or different environments are possible. The example environments discussed and illustrated above are merely representative and not limiting.

Figure 2:
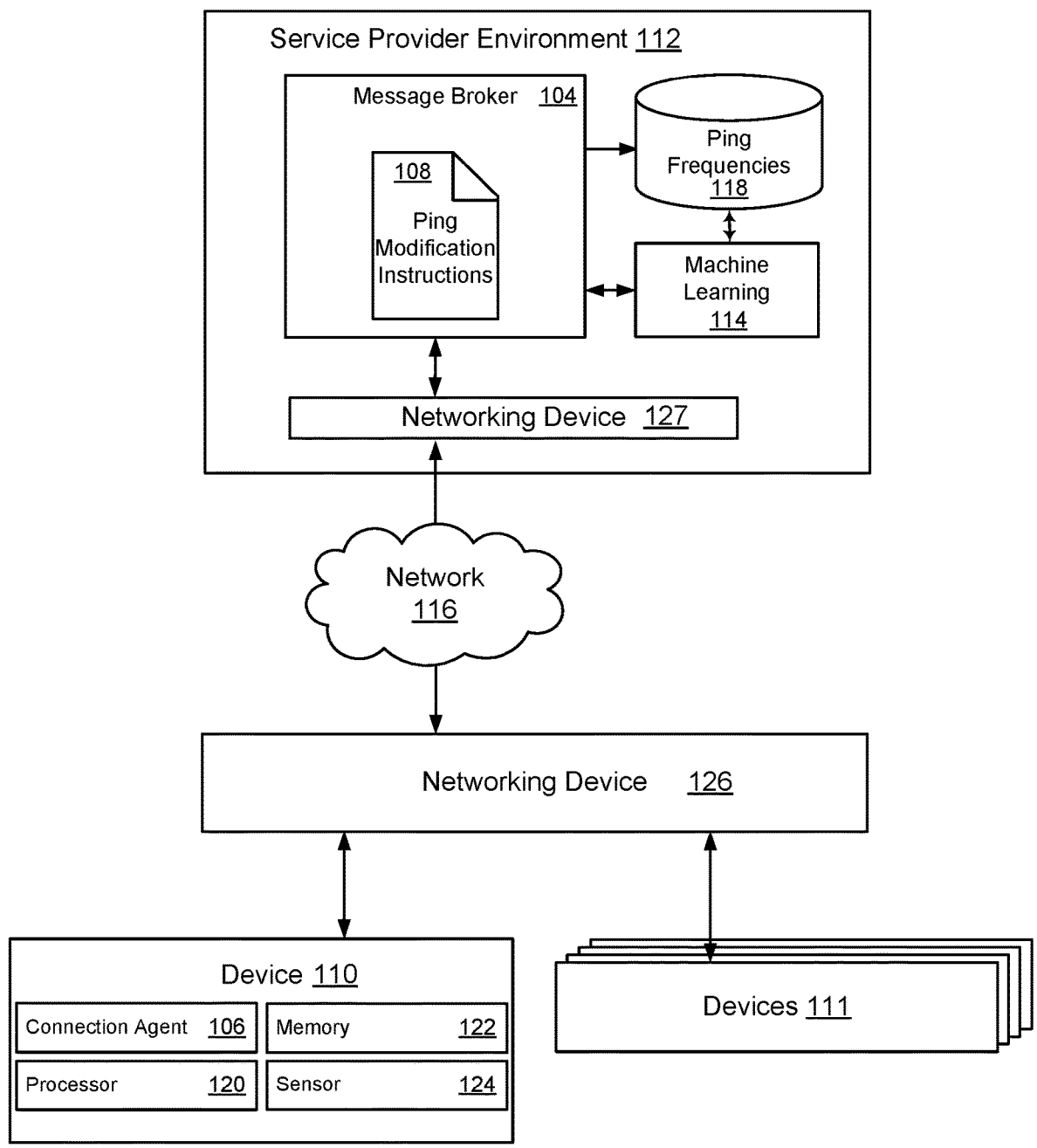
FIG. 2 is a block diagram illustrating a system for modifying a ping frequency of a device based on ping modification instructions received from a message broker in a service provider environment in accordance with an example of the present technology.

Referring now to FIG. 2, an example implementation is illustrated which is similar in some regards to that of FIG. 1A, including a device 110 configured to establish a network connection over a network 116 with a message broker 104 in a service provider environment 112.

In this example, message broker 104 in the service provider environment 112 may dynamically control the ping frequency of the device 110 from the service provider environment 112. The message broker 104 may send ping modification instructions 108 over the network 116 to the device 110. The ping modification instructions 108 may instruct the device 110 to set the ping to a defined ping frequency or interval. Alternatively, the ping modification instructions 108 may instruct the device 110 to modify the ping frequency or interval by some percentage or value. The device 110 may respond by sending ping messages at the instructed frequency or interval. Using ping modification instructions 108 sent from the service provider environment 112, the system may better manage fluctuations in network connectivity or may reduce the efforts by the device 110 to enhance the ping frequency.

In one example, the message broker 104 may maintain network connections with other devices 111. The message broker 104 may determine and set a ping frequency for the device 110 based on the ping frequencies of the other devices 111. Particularly if the other devices 111 are similar to the device 110, are on a same local network as device 110, and/or communicate via the same or similar networking device 126, a ping frequency for the other devices 111 may be expected to be fairly suitable for use by the device 110. The ping frequencies of the other devices 111 may be stored in a ping frequencies data store 118 and accessed to generate the ping modification instructions 108 when device 110 establishes a connection with the message broker 104.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

FIG. 2 illustrates the device 110 communicating over the network 116 with the message broker 104 via networking device 126. Different pieces of network equipment such as routers or load balancers that implement NAT or TCP/IP connection proxying or other connection oriented logic have different timeouts for determining whether a connection is inactive or when no traffic is flowing. As a result, a device manufacturer or installer may be challenged to determine a suitable ping frequency for low traffic volume without network equipment terminating the connection because the ping frequency was too low.

A device 110 may determine a ping frequency and send a message to the message broker 104 informing the message broker 104 of the ping frequency when initially establishing a connection with the message broker 104. The message broker 104 may understand based on this information a setting of the ping frequency to understand when to expect ping messages. If a ping message is not received within the ping frequency, the message broker may terminate the connection or attempt to communicate with the device 110. If the message broker understands from connections with other devices 111 that the ping frequency determined by the device 110 is too low and will result in dropped connections, the message broker may instruct the device 110 to send ping messages more frequently.

The device 110 in the example of FIG. 2 may receive ping modification instructions 108 to modify the ping frequency. For IoT deployment and communications, connections between a device 110 and the message broker 104 may be long lived. For example, a network connected device, such as a light bulb may wait a half day or more between requests for status or receipt of instructions, such as to switch state between 'on' and 'off.' If there are no other communications during this period, the light bulb or the message broker 104 may be unaware of whether the light bulb is still connected until the next communication (e.g., status request, state change instruction, etc.) is attempted. If the connection has not been maintained, then the communication may fail. While the connection may be re-established, and in some instances the communication may be repeated, the communication may have been lost or become stale (such as outdated or losing usefulness) in some instances due to the failure to maintain the connection. Thus, the instruction to change state or report will appear to be slow to an end user. Avoiding the appearance of a slow device or unresponsiveness may be valuable.

The message broker 104 may be configured to allow any arbitrarily long connection times, but even if the device 110 is also configured to allow the long connection times, there may be limited to no control over intermediary network devices 126. On home networks, for example, the home router as the network device 126 may provide the ability to protect data within the home network and may encrypt data flowing to and from the home network. Thus, the device 110 may not be able to establish a direct connection to the message broker 104. Likewise, the message broker 104 may have limited ability to open the connection to the device 110. As a result, the device 110 may typically request that the networking device 126 open the connection to the message broker 104. The device 110 may maintain the connection to the message broker 104 at least by periodically sending ping messages and receiving acknowledgement messages. The networking device 126 may recognize that the connection is active by the flow of traffic. If traffic does not flow within a predetermined period of time, the networking device 126 may determine that the connection is inactive and terminate the connection. In an example where a NAT device provides address translation for packets being sent to or from the device 110, inactivity may indicate that the device 110 is no longer available and the NAT may update address translation tables accordingly (i.e., address translation entries are deleted), which may render packets from the message broker 104 undeliverable. Thus, in some examples, maintaining a network connection between the device 110 and the message broker 112 may be focused on determining ping intervals or frequencies which satisfy connection configurations for the networking device(s) 126 rather than timeout intervals at the device 110 or the message broker 104.

The ping modification instructions 108 from the service provider environment 112 may be imperatives or suggestions. For example, as a condition of connectivity, the message broker 104 may set the ping frequency. As another example, the message broker 104 may suggest to the device 110 that based on other devices connected through a same router, a specified ping is likely to successfully maintain the connection. Such imperatives or suggestions may also be based on: a type of device, a manufacturer of a device, a configuration of the networking device 126, a geographic region, a network topology followed by the packets, monitored network conditions and so forth.

As an example implementation, a device 110 may select to use a 1 minute ping interval, which may be considered reliable. The device 110 may open a second connection that uses a 20 minute ping interval and use the second connection for experimentation and improvement. Once the device 110 discovers an improved connection as compared to the 1 minute ping interval used for the first or main connection, the ping interval may be applied to the main connection. The message broker 104 may provide suggestions to assist in the improvement process by the device 110. For example, when the device 110 sets a ping interval for the second connection of 20 minutes and notifies the message broker 104, the message broker 104 may send a message that indicates that other devices from a same geographic region or from a same internet service provider (ISP) that selected a 20 minute connection have not been able to successfully maintain a connection. Rather than waiting for a number of attempts at the 20 minute interval, the device 110 may modify the ping interval to an interval less than 20 minutes.

Ping messages may be application layer messages sent from the device 110 to the message broker 104. However, the device 110 may optionally use both keepalive (KA) messages and ping messages to ensure the connection is maintained. A KA message may be a message sent by one device to another to check that the link between the two devices is operating or to prevent the link from being broken. For example, while the device 110 and the message broker 104 may support long connection timeout periods, a home router such as the networking device 126 may enforce a shorter timeout period and close the connection. The device 110 may minimize network usage by sending ping messages at the longer timeout period supported by both the device 110 and the message broker 104 and may send KA messages to the networking device 126 at the shorter timeout period enforced by the networking device 126. While such a configuration may result in a transmission of a same number of messages from the device 110 as when ping messages are used without combination with KA messages, the configuration results in minimized internet data usage and minimized effect on other devices in a network path between the networking device 126 and the message broker 104. In one example, the KA message frequency may be based on a suggestion from the message broker 104, which suggestion may be based on successful KA message frequencies of other devices connected to the message broker 104. While this example has been described primarily with regard to messages sent from device 110 to networking device 126, a similar strategy of sending KA messages to specific networking devices other than networking device 126 in a network path between the device 110 and service provider environment 112 may also be used. Such an example may not avoid data usage such as on a mobile data plan, but may maintain a connection on certain devices further away from the device 110 along the network path.

The service provider environment 112 may use a second networking device 127 as a gateway between the message broker 104 and the network 116. The second networking device 127 may provide routing, network address translation, or other functionality such as has been described with regard to the first networking device 126 described. The second networking device 127 may simply represent another one of any number of networking devices which may be in a network path between the device 110 and the message broker 104 in addition to the first networking device 126.

The service provider environment 112 may use server-side machine learning with inputs based on device type, hardware configurations, current or historical network conditions, changes to network topography or topology, etc. to generate the recommendations to the device 110. The machine learning may be performed at the message broker 104 or separate from the message broker 104, such as at a machine learning service 114 or module.

The message broker 104 when connected to multiple devices 111 sharing one or more characteristics, such as device type, corporate network, or the like, may suggest a modified ping frequency at one of the multiple devices 111 to test whether the modified ping frequency is suitable without suggesting each of the devices 111 test the modified ping frequency. A successful test at the one of the devices 111 may be expected to provide similar success at the other of the devices 111. The one device may either use the main connection channel for testing or may open a second communication channel for testing and experimentation.

The message broker 104 may recommend one of the devices 111 test a different ping interval if a predetermined period of time has elapsed since the ping interval any device of the group of devices has been modified and no data is available to determine whether a modified ping interval may be better. In another example, the message broker 104 may identify when network conditions or a part of a network topology has changed and suggest that at least one of the devices 111 test a modified ping frequency. As another example, for changing network conditions, the message broker 104 may suggest that each of the devices 111 modify the ping frequency. Whether the suggestion is to increase or decrease the ping frequency may be based at least in part on how the network conditions are changing and further based on any predefined rules. For example, with increased network instability, the message broker 104 may suggest a higher ping frequency to increase the likelihood of delivery of messages and with increased network stability the message broker 104 may suggest a reduced ping frequency. Alternatively, with increased network instability, the message broker 104 may suggest to reduce the ping frequency to avoid further contributing to network instability and assist in stabilizing the network.

In one example, rather than receive ping frequency modification instructions from the message broker 104, a hub or local host on a local network with the device 110 may make recommendations or send modification instructions to the devices 110, 111. Communications with the message broker 104 sent via the hub or the devices 110, 111 may maintain a connection with the hub that is separate from the connection with the message broker 104. The hub may be provided with logic to determine based on network conditions, device types, etc. what ping frequency to instruct a particular device 110 to use.

In yet another example, rather than receiving ping frequency modification instructions from the message broker 104 or from a local host, the device 110 may be configured to determine modifications to the ping frequency. For example, the device 110 may maintain a record of ping frequencies and connectivity over time and may make decisions on how to modify the ping frequency based on a historical record. For example, the device 110 may maintain multiple connections with the message broker 104, one for maintaining a stable connection and another for testing modifications to the ping frequency, as has been described. The test connection may identify a ping frequency which is usable for maintaining a connection and this ping frequency may be implemented on the stable connection. However, if the stable connection loses the connection within a predetermined time frame, the ping frequency may again be modified to a more stable ping frequency. There may be fluctuations in the network which affect the ability to consistently maintain a connection at a particular ping frequency even though the ping frequency appeared suitable in testing. Accordingly, the device 110 may identify from the historical record maintained that the same or similar ping frequency as was tested on the test connection has not had a desired longevity, and the device 110 may thus select a different or a more stable ping frequency in spite of results from the test connection. It is noted that this example is not limited to modification testing using multiple connections between the device 110 and the message broker 104.

Where multiple connections are maintained between the device 110 and the message broker 104, a traceroute operation may be performed to identify a network path between the device 110 and the message broker 104. First and second connections may have traveled different network paths. In one example, the connections may be through different firewall devices. Network paths traversed may thus be tested in addition to ping frequency modification to test stability of the network connection.

In one example, device 110 may determine whether a user is accessing or interacting with the device 110, either directly or indirectly (e.g., remotely via another device). When the user is interacting with the device 110, the ping frequency may be increased to ensure a more positive user experience. When the user discontinues the interaction, the ping frequency may be reduced to the pre-modified or pre-interaction ping frequency. In one example, user interaction may invoke an interaction mode that lasts for a predefined period of time, such as a number of minutes. Activation of the interaction mode and the length of invocation may vary by device, application, receipt of a particular message, or the like. The message broker 104 may provide suggestions for ping frequencies for use during the interaction mode and/or outside of the interaction mode, or such determinations may be made locally at the device 110.

Figure 3:
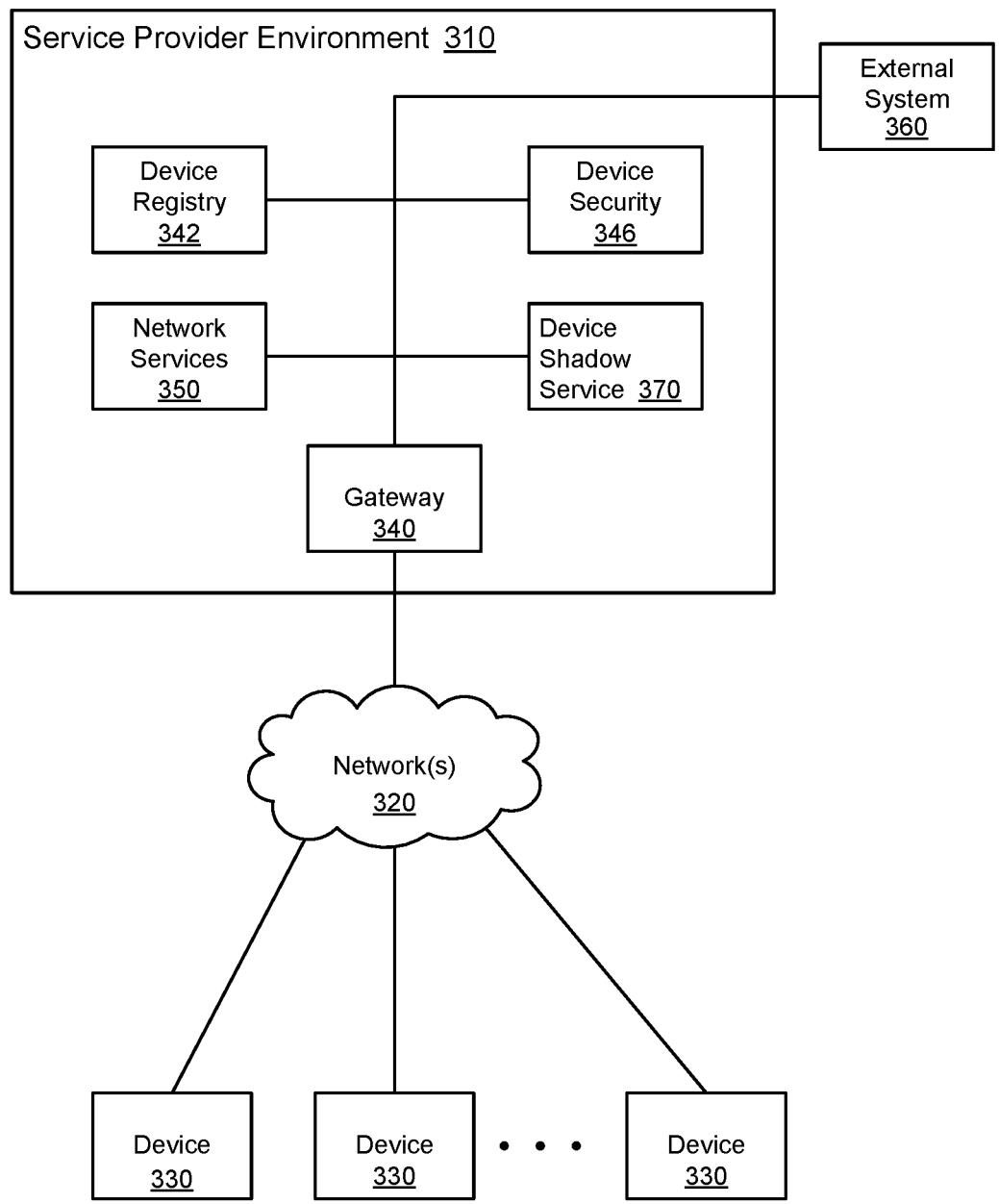
FIG. 3 is a block diagram illustrating a computer networking architecture for providing devices access to network services in accordance with an example of the present technology.

FIG. 3 is a block diagram illustrating an example service provider environment 310 with which the devices 330 described earlier may communicate. The service provider environment 310, which may be referred to as a device communication environment or system that comprises various resources made accessible via a gateway 340 to the devices 330 that access the gateway 340 via a network 320. The devices 330 may access the service provider environment 310 in order to access services such as a device shadow service 370, data storage, and computing processing features. Services operating in the service provider environment 310 may communicate data and messages to the devices 330 in response to requests from the devices 330 and/or in response to computing operations within the services.

The service provider environment 310 may comprise communicatively coupled component systems 340, 342, 346, 350 and 370 that operate to provide services to the devices 330. The gateway 340 may be configured to provide an interface between the devices 330 and the service provider environment 310. The gateway 340 receives requests from the devices 330 and forwards corresponding data and messages to the appropriate systems within the service provider environment 310. Likewise, when systems within the service provider environment 310 attempt to communicate data instructions to the devices 330, the gateway 340 routes those requests to the correct device 330.

The gateway 340 may be adapted to communicate with varied devices 330 using various different computing and communication capabilities. For example, the gateway 340 may be adapted to communicate using either TCP/IP or UDP (User Datagram Protocol) protocols. Likewise, the gateway 340 may be programmed to receive and communicate with the devices 330 using any suitable protocol including, for example, MQTT, CoAP, HTTP, HTTP/2, AMQP, and HTTPS. The gateway 340 may be programmed to convert the data and instructions or messages received from the devices 330 into a format that may be used by other server systems or services comprised in the service provider environment 310. In one example, the gateway 340 may be adapted to convert a message received using the HTTPS protocol into a JSON formatted message that is suitable for communication to other servers or services within the service provider environment 310.

The gateway 340 may store, or may control the storing, of information regarding the devices 330 that have formed a connection to the particular gateway 340 and for which the particular gateway 340 may be generally relied upon for communications with the device 330. In one example, the gateway 340 may have stored thereon information specifying the particular device 330 such as a device identifier. For each connection established from the particular device 330, the gateway 340 may also maintain information identifying the connection. For example, a connection identifier may be generated and stored for each connection established with a particular device 330. Information relating to the particular connection may also be stored. For example, information identifying the particular socket of the gateway 340 on which the connection was established, as well as information identifying the particular protocol used by the device 330 on the connection may be stored by the gateway 340. Information such as the socket and protocol may be used in order to facilitate further communications via the particular connection.

In one example, the gateway 340 may communicate via any suitable networking technology with a device registry 342. The device registry 342 may be adapted to track the attributes and capabilities of each device 330. In an example, the device registry 342 may be provisioned with information specifying the attributes of the devices 330. The device registry 342 may comprise data specifying rules or logic (e.g., automation rules) for handling various requests that may be received from the devices 330. The device registry 342 may be programmed to convert specialized device functions or commands received in particular communication protocols such as, for example HTTPS, MQTT, CoAP, into functions or commands using particular protocols that are understood by other of the servers or services in the service provider environment 310. In one example, the device registry 342 may be provisioned with information specifying that upon receipt of a particular request from a particular device 330, a request should be made to store the payload data of the request in a particular network service 350. The device registry 342 may be similarly programmed to receive requests from device registry 342 and network services 350 and convert those requests into commands and protocols understood by the devices 330.

The device shadow service 370 may maintain state information for each connected device 330. In an example embodiment, the device shadow service 370 maintains for each device 330 that has connected to the environment 310 information specifying a plurality of states. In an example scenario, the device shadow service 370 may comprise a recorded state and a desired state. The recorded state may represent the existing state of the particular device 330 as presently known to the device shadow service 370. The device shadow service 370 may be configured to manage multi-step device state transitions as described earlier. The device shadow service 370 communicates with the device gateway 340 in order to communicate requests to update a status to a particular device 330. For example, the device shadow service 370 may communicate to the device gateway 340 a sequence of state transition commands that update the status of a device 330. The device gateway 340 may, in response, communicate the appropriate commands formatted for the particular device.

The device security service 346 maintains security-related information for the devices 330 that connect to the service provider environment 310. In one example, the device security service 346 may be programmed to process requests to register devices with the service provider environment 310. For example, entities such as device manufacturers, may forward requests to register devices 330 with the service provider environment 310. The device security service 346 receives registration requests and assigns unique device identifiers to devices 330 which use the device identifiers on subsequent requests to access the service provider environment 310. The device security service 346 stores, for each registered device, authentication information that may be provided during the device registration process. For example, a request to register a device 330 may comprise information identifying the device 330 such as a device serial number and information for use in authenticating the device 330. In one example, the information may comprise a digital certificate and may comprise a public key of a public key-private key pair. The information may be stored in relation to the assigned device identifier for the particular device 330. When the device 330 subsequently attempts to access the service provider environment 310, the request may be routed to the device security service 346 for evaluation. The device security service 346 determines whether authentication information provided in the request is consistent with the authentication information stored in relation to the device identifier and provided during the registration process.

The device security service 346 may be further programmed to process request to associate particular entities (individuals or organizations) with particular devices 330. The device security service 346 may be adapted to receive requests to register entities, which may be, for example, individuals, users, accounts, and/or organizations, as authorized to control or communicate with a particular device 330. In one example, a request may be received from an individual or organization that may have purchased a device 330 from a manufacturer. For example, the device may be a dishwasher, thermostat, or lighting assembly that an individual or organization purchased from the manufacturer. The individual or organization may initiate a request to register the device 330 with the individual or an organization with which the organization is associated. The request may be routed to a web service which may be comprised in service provider environment 310 or which communicates the request to the service provider environment 310. The request identifies the device 330 and the particular entity (individual or organization) that is requesting to be associated with the device 330. In one example, the request may comprise a unique device identifier that was assigned when the device 330 was registered with the system. The request further may comprise information uniquely identifying the entity that is registering as having authority to communicate with and/or control the particular device 330.

The device security service 346 stores the information identifying the particular entity in relation with the device identifier. When the particular entity subsequently attempts to control or communicate data to the particular device 330, the device security service 346 may use the information to confirm that the particular entity is authorized to communicate with or control the particular device 330. When an entity that has not been registered as being authorized to communicate with the device 330 attempts to communicate with or control the device 330, the device security service 346 may use the information stored in the device security service 346 to deny the request.

A network service 350 may be any resource or processing service that may be used by any of services 340, 342, 346, or 370 in processing requests from the devices 330. In one example, network services 350 may provide data storage and retrieval services and/or on-demand processing capacity. In an example scenario, the network services 350 may be any of numerous network accessible services including, for example, web or cloud-based services. In one example, the network services 350 may be programmed to provide particular processing for particular devices 330 and/or groups of devices 330. For example, a network service 350 may be provisioned with software that coordinates the operation of a particular set of devices 330 that control a particular manufacturing operation.

Services 340, 342, 346, 350, and 370 may be communicatively coupled via any suitable networking hardware and software. For example, the services may communicate via a local area network or wide area network.

An external system 360 may access service provider environment 310 for any number of purposes. In one example, an external system 360 may be a system adapted to forward requests to register devices 330 with the service provider environment 310. For example, an external system 360 may include a server or service operated by or for a device manufacturer that sends requests to service provider environment 310, and device security service 346 in particular, to register devices 330 for operation with service provider environment 310. Similarly, the external system 360 may be a system operated to provide a gateway for entities (individuals or organizations) to register an ownership or control relationship with a particular device 330.

The devices 330 may be any devices that may be communicatively coupled via a network 320 with the service provider environment 310. For example, the devices 330 may be computing devices such as smart phones and tablet computers, automobiles, appliances such as washers and driers, industrial sensors, switches, control systems, etc. In one example, each of devices 330 may communicate over the network 320 to store data reflecting the operations of the particular device 330 and/or to request processing provided by, for example, network services 350. While FIG. 3 depicts three devices 330, it will be appreciated that any number of devices 330 may access the service provider environment 310 via the gateway 340. Further it will be appreciated that the devices 330 may employ various different communication protocols. For example, some devices 330 may transport data using TCP/IP, while others may communicate data using UDP. Some devices 330 may use MQTT, while others may use CoAP, and still others may use HTTP. It will also be appreciated that each of devices 330 may be programmed to send and receive particular functions or commands in its requests that are not compatible with other devices or even the systems within service provider environment 310. The gateway 340 may be programmed to receive and, if needed, attend to converting such requests for processing with the service provider environment 310.

FIG. 4 is a block diagram illustrating an example service provider environment 400 that may be used to execute and manage a number of computing instances 404*a-e*. In particular, the service provider environment 400 depicted illustrates one environment in which the technology described herein may be used. The service provider environment 400 may be one type of environment that includes various virtualized service resources that may be used, for instance, to host computing instances 404*a-e*.

The service provider environment 400 may be capable of delivery of computing, storage and networking capacity as a software service to a community of end recipients. In one example, the service provider environment 400 may be established for an organization by or on behalf of the organization. That is, the service provider environment 400 may offer a "private cloud environment." In another example, the service provider environment 400 may support a multi-tenant environment, wherein a plurality of customers may operate independently (i.e., a public cloud environment). Generally speaking, the service provider environment 400 may provide the following models: Infrastructure as a Service ("IaaS"), Platform as a Service ("PaaS"), and/or Software as a Service ("SaaS"). Other models may be provided. For the IaaS model, the service provider environment 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on a computing service platform provided by the service provider environment 400 without incurring the cost of buying and managing the underlying hardware and software. The SaaS model allows installation and operation of application software in the service provider environment 400. End customers may access the service provider environment 400 using networked client devices, such as desktop computers, laptops, tablets, smartphones, etc. running web browsers or other lightweight client applications, for example. Those familiar with the art will recognize that the service provider environment 400 may be described as a "cloud" environment.

The particularly illustrated service provider environment 400 may include a plurality of physical hosts 402*a-e*. While six physical hosts are shown, any number may be used, and large data centers may include thousands of physical hosts. The service provider environment 400 may provide computing resources for executing computing instances 404*a-e*. Computing instances 404*a-e* may, for example, be virtual machines. A virtual machine may be an instance of a software implementation of a machine (i.e. a computer) that executes applications like a physical machine. In the example of a virtual machine, each of the physical hosts 402*a-e* may be configured to execute an instance manager 408*a-e* capable of executing the instances. The instance manager 408*a-e* may be a hypervisor, virtual machine monitor (VMM), or another type of program configured to enable the execution of multiple computing instances 404*a-e* on a single server. Additionally, each of the computing instances 404*a-e* may be configured to execute one or more applications.

A server 414 may execute a message broker service 416 configured to execute the functions described earlier. In one example, the message broker service 416 may be hosted by one or more computing instances 404*a-e*. In some examples, one or more computing instances 404*a-e* may be configured to host instances of compute service code that may be called to update the state of a device that interfaces with the message broker service 416.

A network 410 may be utilized to interconnect the service provider environment 400 and the physical hosts 402*a-e*, 414. The network 410 may be a local area network (LAN) and may be connected to a Wide Area Network (WAN) 412 or the Internet, so that end customers may access the service provider environment 400. The network topology illustrated in FIG. 4 has been simplified, many more networks and networking devices may be utilized to interconnect the various computing systems disclosed herein.

Figure 5:
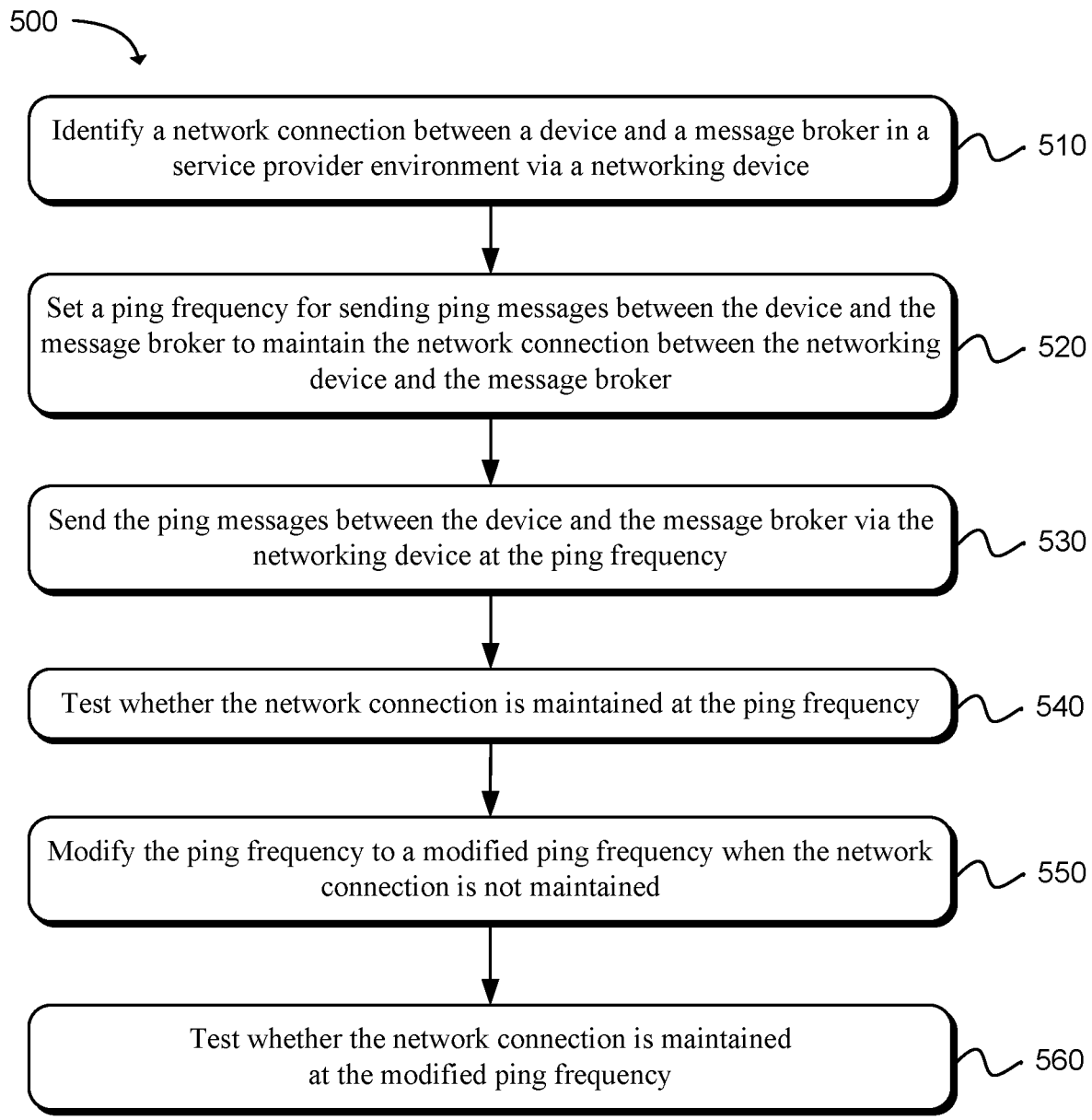
FIGS. 5-7 are flow diagrams illustrating method for modifying reachability message frequencies in accordance with examples of the present technology.
Figure 6:
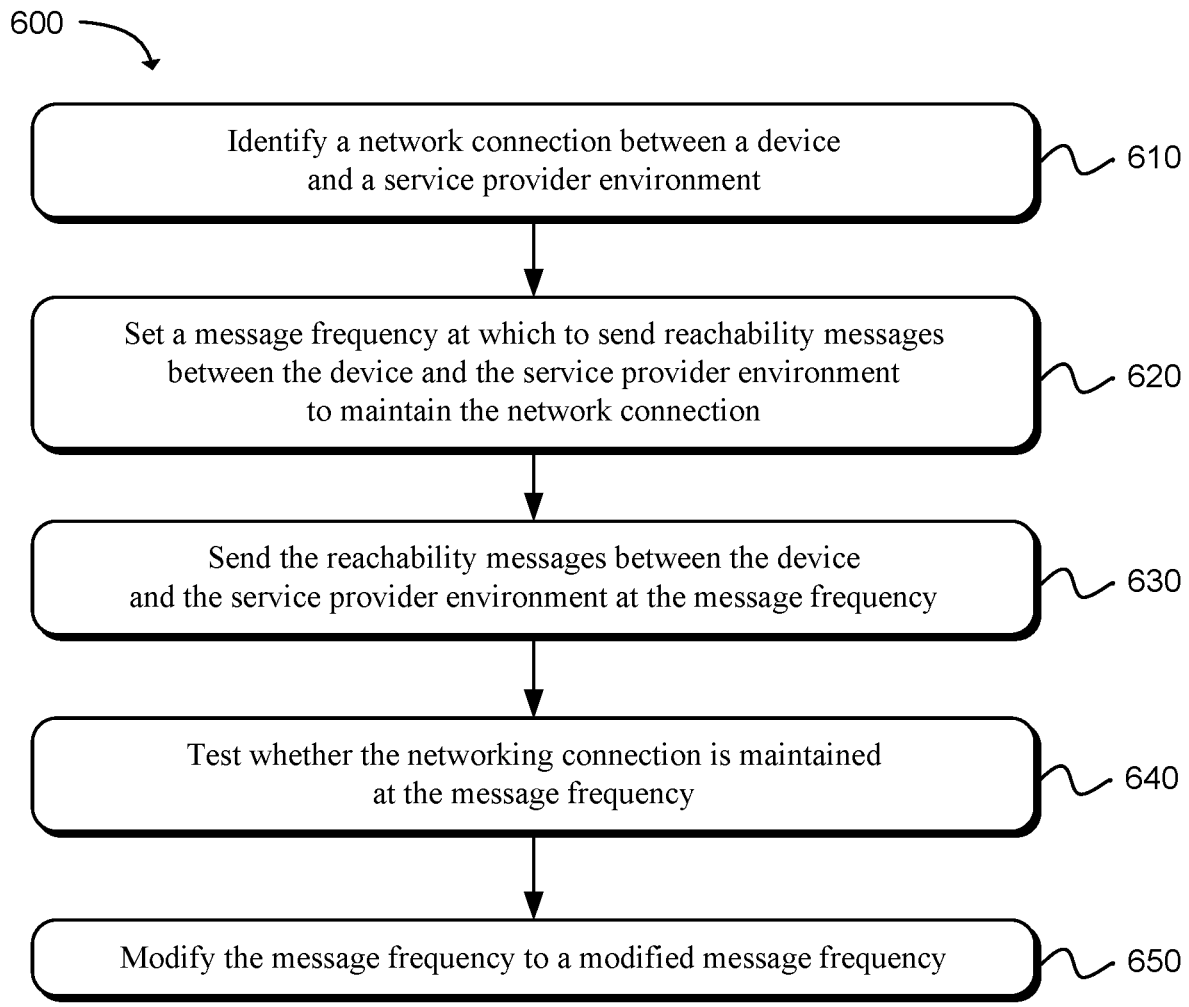

FIGS. 5-6 illustrate flow diagrams of methods according to the present technology. For simplicity of explanation, the method is depicted and described as a series of operations. However, operations in accordance with this disclosure can occur in various orders and/or concurrently, and with other operations not presented and described herein. Furthermore, not all illustrated operations may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

FIG. 5 illustrates one example of the present technology including a method 500 for modifying a ping frequency of a device, such as an internet-of-things (IoT) device. The method 500 may include identifying 510 a network connection between the device and a message broker in a service provider environment via a networking device. In one example, the device may be a router. The network connection may be a TCP/IP connection. The network connection may be established by the device or the message broker. The message broker may be a server or may communicate via a server. The server may be prepared to accept an incoming connection. The establishment of the connection may originate from the IoT device. For example, the server may maintain a passive open connection by calling socket, bind, and listen. The IoT device may issue an active open by calling connect.

The method 500 may include setting 520 a ping frequency for which to send ping messages between the device and the message broker to maintain the network connection between the networking device and the message broker. Regardless of which of the device or the message broker establishes the network connection, either the device or the message broker, or both, may send ping messages or other reachability messages. In one example, the message broker may set the ping frequency and send the ping frequency in the form of instructions to the device. In another example, the device may determine the ping frequency and may transmit the ping frequency to the message broker to inform the message broker when to expect subsequent ping messages to be sent from the device. Regardless of whether the device or the message broker has set the ping frequency, either the device or the message broker, or both, may be configured to subsequently modify the ping frequency based on one or more rules, network conditions, or the like. When the device modifies the ping frequency, the device may notify the message broker of the modification. Similarly, if the message broker determines that a modification is to be made, the message broker may notify the device of the modification.

The IoT device may periodically publish data messages to be consumed by one or more other devices subscribed to receive the data messages via the message broker. Alternatively, or additionally, the IoT device may subscribe to receive data messages from one or more other IoT devices. If the secure connection between the IoT device and the message broker is not maintained then messages sent by one or the other of the IoT device or message broker may not be received. If the connection has closed, a request to re-open the connection is sent in order to ensure delivery of data messages. However, if the IoT device is unaware that the connection has closed, such a request to re-open the connection may not be sent and the IoT device may not receive the intended data messages. The IoT device may recognize that the connection is closed when the IoT device attempts to send a data message to the message broker and the data message is not delivered, which may be determined, for example, by receipt of an acknowledgement (ACK) request from the server. However, by the time the connection failure is recognized and the connection is re-established, the data in the data message may have been lost or may be stale and have lost value or utility. For example, a new data message may be ready to send representing current data where the data in the previous data message is no longer current.

The method 500 may include sending 530 the ping messages between the device and the message broker via an intermediate networking device at the ping frequency. Even if the device and the message broker agree to a specified ping frequency, the networking device may have a connection standard for aging out and terminating old, unused or inactive connections. The method 500 may thus include testing 540 whether the network connection is maintained at the ping frequency. Testing may simply be sending one or more ping messages at the modified ping frequency and determining whether the connection is maintained. Maintenance of the connection may be identified at the device by receipt of acknowledgement (ACK) messages from the message broker. Maintenance of the connection may be identified at the message broker by receipt of ping messages at the identified ping frequency.

The method 500 may include modifying 550 the ping frequency to a modified ping frequency when the network connection is not maintained. The method 500 may also include modifying the ping frequency to a modified ping frequency when the network connection is maintained. For example, modifying the ping frequency may include increasing the ping frequency when the network connection is not maintained at the ping frequency and/or decreasing the ping frequency when the network connection is maintained at the ping frequency. The method 500 may include testing 560 whether the network connection is maintained at the modified ping frequency. As described above, an ACK may be sent in response to a ping message. The ACK may be expected to be received by the ping sender or message sender within a predetermined period of time. Whether the connection has remained open may be tested by receipt of the ACK. If the ACK is not received within the predetermined period of time, the connection may be deemed closed.

FIG. 6 illustrates a method 600 in accordance with another example of the present technology. The method 600 includes identifying 610 a network connection between a device and a service provider environment. The network connection may be, for example, a TCP/IP connection. The network connection may be established with a server in the service provider environment. The server may be a virtualized server. The server may be a message broker or may host a message broker service. The method 600 may include setting 620 a message frequency for which to send reachability messages between the device and the service provider environment to maintain the network connection. The reachability messages may be, for example, ping messages, although other types of messages are also contemplated. For example, if the device sends data messages frequently then the data messages may be used as the reachability messages. The reachability messages may be an indication to the server that the device is reachable.

The method 600 may include sending 630 the reachability messages between the device and the service provider environment at the message frequency and testing 640 whether the networking connection is maintained at the message frequency. The method 600 may also include modifying 650 the message frequency to a modified message frequency. The modification may be performed as determined at the device or based on instructions received from the service provider environment. The modification may be made when the connection is not maintained at the message frequency in order to discover a message frequency that results in a maintained connection. Alternatively, or in addition, the modification may be made when the connection is maintained at the message frequency to reduce the frequency and thus reduce data usage, processor usage, battery usage, and so forth.

In one example of the method 600, the network connection may include a secondary network connection and another message frequency is a secondary message frequency. In this example, the method 600 includes establishing a primary network connection between the device and the service provider environment separate from the secondary network connection; and determining a primary message frequency for which to send primary reachability messages from the device to the service provider environment to maintain the primary network connection. The primary message frequency may be different from the secondary message frequency, and the primary message frequency may be maintained without modification while the secondary message frequency is modified to test whether the secondary network connection is maintained at the modified message frequency.

The method 600 may include receiving an instruction from the service provider environment to modify the message frequency. The instruction may instruct the device to increase or decrease the message frequency and may be based on message frequencies of other devices similar to the device. For example, the instruction may be based on other devices on a local network with the device that also maintain network connections with the service provider environment.

The method 600 may include detecting or determining that a human user is interacting with the device, such as accessing the device, looking at the device, touching the device, manipulating the device, electronically communicating with the device via another device, etc., as may be detected using sensors, a processor, or the like. The message frequency of the reachability messages may be increased when a human is interacting with the device to ensure a more stable connection and better user experience. The message frequency may subsequently be decreased when the user is no longer interacting with the device.

The method 600 may be repeated in whole or in part any number of times until an enhanced reachability message frequency is achieved, based on predefined rules defining the number of times to repeat, based on instructions received from the service provider environment, based on changing network conditions, or based on loss or disruption of the network connection, and so forth.

Figure 7:
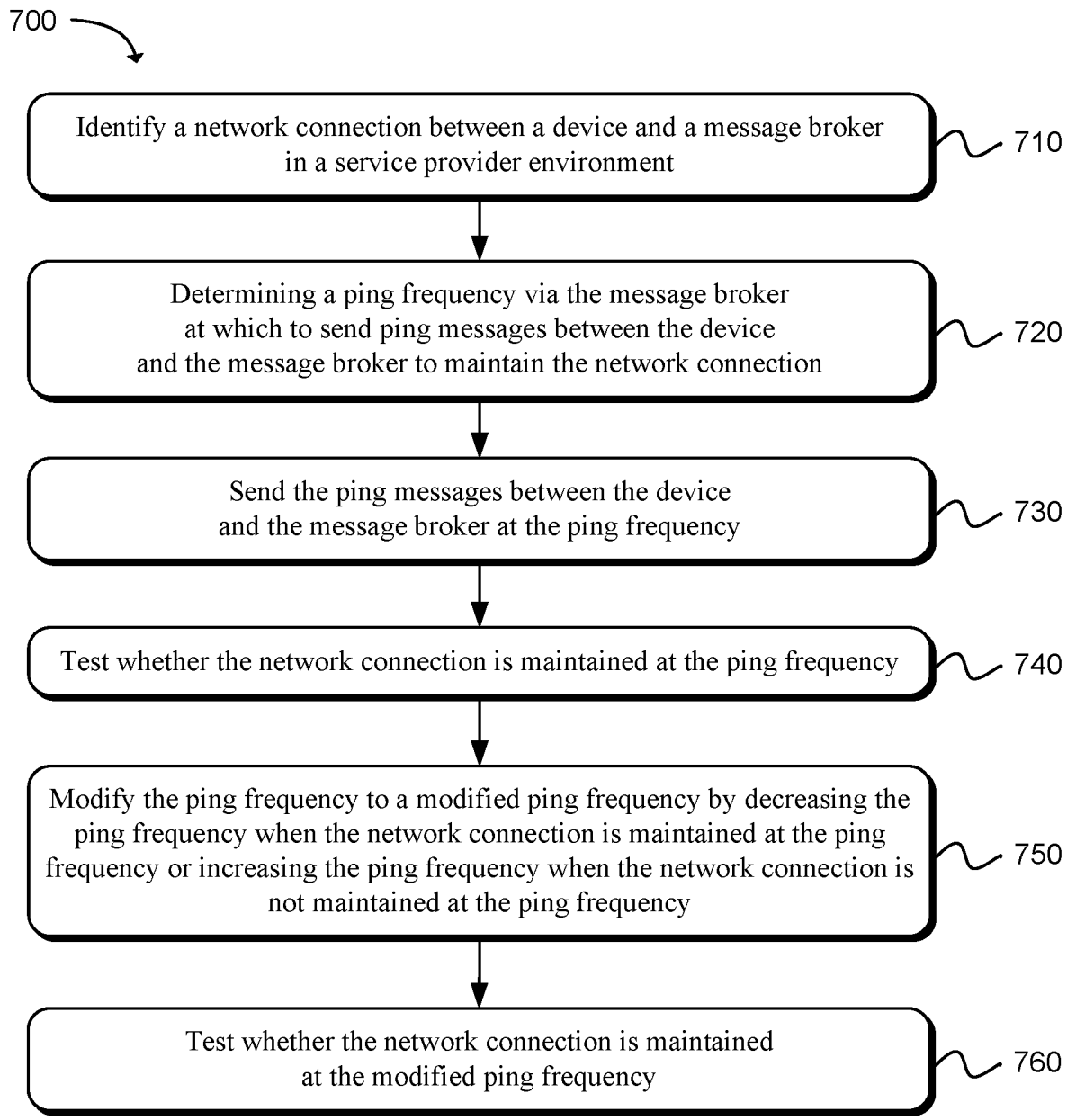

Referring to FIG. 7, a method 700 in accordance with another example of the present technology is illustrated. The method 700 includes identifying 710 a network connection between a device and a message broker in a service provider environment. A ping frequency may be determined 720 via the message broker for which to send ping messages between the device and the message broker to maintain the network connection. The ping frequency may be a suggested ping frequency, for example. The ping messages may be sent 730 between the device and the message broker at the ping frequency. The device and/or the message broker may test 740 and determine whether the network connection is maintained at the ping frequency. The method 700 may include modifying 750 the ping frequency to a modified ping frequency by decreasing the ping frequency when the network connection is maintained at the ping frequency or increasing the ping frequency when the network connection is not maintained at the ping frequency. After modifying the ping frequency, the method 700 may include a subsequent testing 760 step to test whether the network connection is maintained at the modified ping frequency in order to determine whether the modified ping frequency is suitable and is an enhancement of the ping frequency.

The method 700 may include sending second ping messages or keepalive (KA) messages to a networking device acting as a proxy on a local network with the device to keep the network connection alive. The second ping messages may be sent at a greater ping frequency than the ping messages sent to the message broker.

The method 700 may include repeatedly modifying the ping frequency starting with a comparatively larger ping interval and then decreasing the ping interval until determining that the connection is maintained. Multiple ping attempts may be made at each interval when the connection is closed before further decreasing the ping interval. In other words, a ping message may be sent at each interval repeated times before decreasing the ping interval. A determination may be made as to whether the connection is maintained at the ping interval across a predetermined number of attempts. At a ping interval where the connection is maintained, the ping interval may be set for further use. As an alternative example, the method may include repeatedly modifying the ping frequency starting with a comparatively smaller ping interval and then increasing the ping interval until determining that the connection is closed. The method 700 may revert to a previous ping interval when the connection is closed and may determine whether out of a predetermined number of attempts that the connection is maintained at the ping interval. The ping interval may be selected or chosen for further use where the connection is maintained.

The method 700 may include receiving an instruction from the message broker to modify the ping frequency. The instruction may be based on at least one of network conditions, a geographic location of the device, an internet service provider used by the device to send the ping messages to the message broker, or a type or configuration of the device. The instructions may be sent after a predetermined period of time has elapsed with no modifications to the ping frequency to test, for example, whether conditions have changed such that a lower ping frequency is usable.

The device may be a physical device, such as an IoT device. The connection may be made electronically to a service provider environment that is physically distant or remote from the device. The physical device may be an IoT device comprising at least a processor, a memory, and a sensor.

In some examples, this or other methods described herein may be implemented wholly or partially as computer readable program code executed by a processor and the computer readable code may be embodied on a non-transitory computer usable medium.

Figure 8:
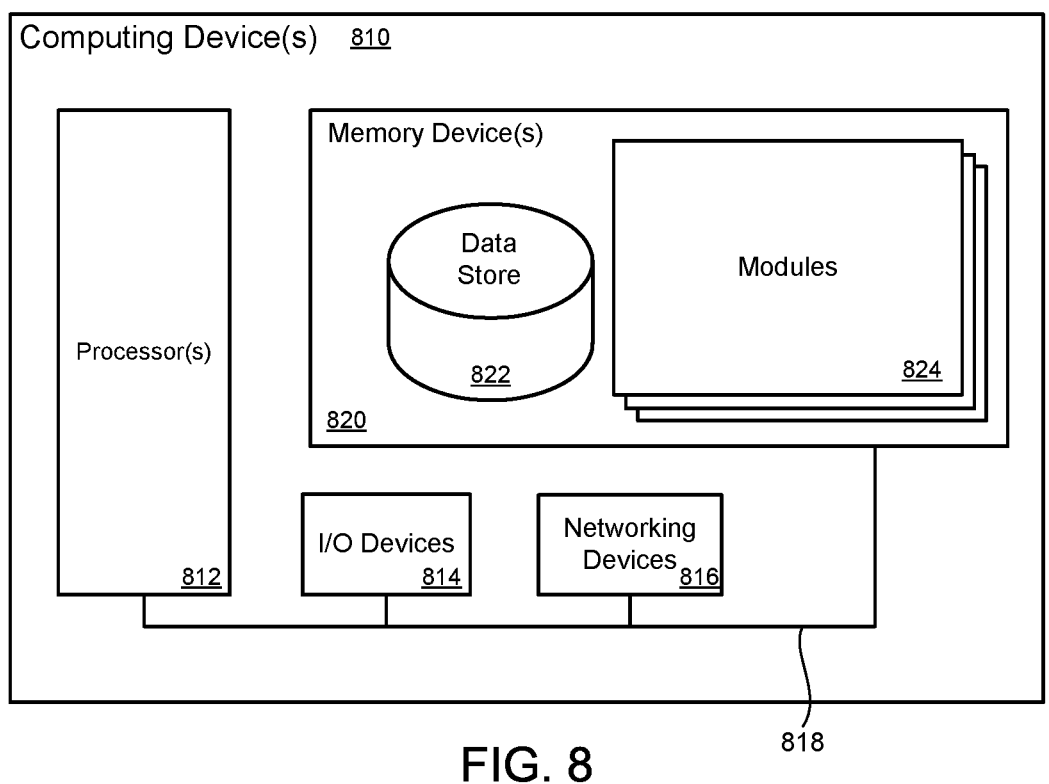
FIG. 8 is block diagram illustrating a computing device that may be used to execute a system or method for modifying reachability message frequencies in accordance with an example of the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data setting such as a carrier wave or other transport mechanism and includes any information delivery media. A "modulated data setting" means a setting that has one or more of its characteristics set or changed in such a manner as to encode information in the setting. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory computer-readable medium comprising computer-executable instructions which, when executed by a processor, implement a method for modifying a ping frequency of a device, comprising:
identifying a network connection between the device and a message broker in a service provider environment via a first networking device hosted in the service provider environment;
setting a first ping frequency at which to send ping messages between the device and the message broker to maintain the network connection between the first networking device and the message broker wherein the first ping frequency is determined by the message broker;
sending the ping messages between the device and the message broker via the first networking device at the first ping frequency;
sending keepalive messages between the device and a second networking device hosted on a local network with the device to prevent a link between the device and the second networking device from being broken, wherein the second networking device facilitates a connection between the device and the service provider environment, wherein a frequency of the keepalive messages is higher than the first ping frequency; determining at the message broker that the network connection is maintained at the first ping frequency;
decreasing the first ping frequency to a second ping frequency that is determined by the message broker; and
testing whether the network connection is maintained at the second ping frequency.

2. The method of claim 1, further comprising: increasing the second ping frequency to a third ping frequency when the network connection is not maintained at the second ping frequency.

3. The method of claim 1, further comprising: decreasing the second ping frequency to a third ping frequency when the network connection is maintained at the second ping frequency.

4. The method of claim 1, further comprising transmitting the first ping frequency from the device to the message broker to enable the message broker to determine when to expect subsequent ping messages to be sent from the device.

5. The method of claim 4, further comprising transmitting the second ping frequency from the device to the message broker after decreasing the ping frequency to the second ping frequency.

6. A computer-implemented method, comprising:
identifying a network connection between a device and a service provider environment via a first networking device hosted in the service provider environment;
setting a first message frequency at which to send reachability messages between the device and the service provider environment to maintain the network connection wherein the first message frequency is determined by the service provider environment;
sending the reachability messages between the device and the service provider environment at the first message frequency;
sending keepalive messages between the device and a second networking device hosted on a local network with the device to prevent a link between the device and the second networking device from being broken, wherein a frequency of the keepalive messages is higher than the first message frequency;
determining at the service provider environment that the networking connection is maintained at the first message frequency; and
decreasing the first message frequency to a second message frequency that is determined by the service provider environment.

7. The method of claim 6, further comprising:
identifying a second network connection between the device and the service provider environment separate from the network connection; and
determining a third message frequency for which to send second reachability messages between the device and the service provider environment to maintain the second network connection; and
wherein the third message frequency is different from the first message frequency, and wherein the third message frequency is maintained while the first message frequency is modified to test whether the network connection is maintained at the second message frequency.

8. The method of claim 6, further comprising receiving an instruction at the device from the service provider environment to modify the first message frequency.

9. The method of claim 8, wherein the instruction instructs the device to increase or decrease the first message frequency.

10. The method of claim 8, wherein the instruction is based on message frequencies of other devices similar to the device.

11. The method of claim 8, wherein the instruction is based on other devices on a local network with the device that also maintain network connections with the service provider environment.

12. The method of claim 6, further comprising: increasing the first message frequency when a user is interacting with the device.

13. The method of claim 6, further comprising: decreasing the first message frequency when a user is not interacting with the device.

14. The method of claim 6, further comprising modifying the first message frequency repeated times in a random or non-linear pattern.

15. The method of claim 6, wherein the second networking device is acting as a proxy on the local network with the device, wherein the keepalive messages are sent at a greater frequency than the first message frequency.

16. A computer-implemented method, comprising:
identifying a network connection between a device and a message broker in a service provider environment via a first networking device hosted in the service provider environment;
determining a first ping frequency via the message broker at which to send ping messages between the device and the message broker to maintain the network connection between the first networking device and the message broker;
sending the ping messages between the device and the message broker at the first ping frequency via the first networking device;
sending keepalive messages between the device and a second networking device hosted on a local network with the device to prevent a link between the device and the second networking device from being broken, wherein a frequency of the keepalive messages is higher than the first ping frequency;
determining at the message broker that the network connection is maintained at the first ping frequency;
modifying the first ping frequency to a second ping frequency by increasing a ping interval of the first ping frequency when the network connection is maintained at the first ping frequency wherein the second ping frequency is determined by the message broker; and
testing whether the network connection is maintained at the second ping frequency.

17. The method of claim 16, wherein the second networking device is acting as a proxy on the local network with the device, wherein the keepalive messages are sent at a greater frequency than the first message frequency.

18. The method of claim 16, further comprising:
repeatedly modifying the first ping frequency starting with an initial ping interval and then decreasing the ping interval until determining that the connection is maintained;
sending multiple ping messages at each interval before further decreasing the ping interval; and
determining whether the connection is maintained at the ping interval for a predetermined number of attempts and then maintaining the interval where the connection is maintained.

19. The method of claim 16, further comprising:
repeatedly modifying the first ping frequency starting with an initial ping interval and then increasing the ping interval until determining that the connection is closed;

reverting to the ping interval prior to when the connection was closed; and determining whether out of a predetermined number of attempts that the connection is maintained at the ping interval and then applying the interval where the connection is maintained.

20. The method of claim 16, further comprising receiving an instruction at the device from the message broker to modify the first ping frequency, wherein the instruction is based on at least one of network conditions, a geographic location of the device, an internet service provider used by the device to send the ping messages to the message broker, or a type or configuration of the device; and wherein the instructions are sent after a predetermined period of time has elapsed with no modifications to the first ping frequency to test whether conditions have changed such that a lower ping frequency is usable to maintain the connection.

\* \* \* \* \*